(12) United States Patent
Liu et al.

(10) Patent No.: US 7,613,402 B2
(45) Date of Patent: Nov. 3, 2009

(54) DUOBINARY RECEIVER

(75) Inventors: Xiang Liu, Marlboro, NJ (US); Lothar Benedict Erhard Josef Moeller, Hazlet, NJ (US); Xing Wei, New Providence, NJ (US); Chongjin Xie, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 954 days.

(21) Appl. No.: 10/730,413

(22) Filed: Dec. 8, 2003

(65) Prior Publication Data

US 2005/0123068 A1      Jun. 9, 2005

(51) Int. Cl.
*H04B 10/06* (2006.01)

(52) U.S. Cl. ........................... 398/202; 398/155

(58) Field of Classification Search ............... 398/202, 398/208, 155
See application file for complete search history.

(56) References Cited

U.S. PATENT DOCUMENTS

| | | | |
|---|---|---|---|
| 4,144,565 A | | 3/1979 | Bouknecht et al. |
| 4,780,888 A | * | 10/1988 | Solhjell et al. ............... 375/350 |
| 5,351,271 A | | 9/1994 | Coquerel |
| 5,453,826 A | * | 9/1995 | Sugimoto et al. .......... 356/73.1 |
| 5,774,064 A | | 6/1998 | Lambropoulos et al. |
| 5,777,765 A | * | 7/1998 | Deloddere et al. .......... 398/154 |
| 5,867,534 A | | 2/1999 | Price et al. ................... 375/286 |
| 6,188,497 B1 | | 2/2001 | Franck et al. ............... 398/183 |
| 6,295,152 B1 | | 9/2001 | Wedding |
| 6,778,589 B1 | | 8/2004 | Ishii ........................... 375/136 |
| 6,839,130 B2 | * | 1/2005 | Araki et al. ................ 356/73.1 |
| 7,142,621 B2 | | 11/2006 | Vallet et al. ................. 375/355 |

(Continued)

FOREIGN PATENT DOCUMENTS

DE       198 23 705 A1    12/1999

(Continued)

OTHER PUBLICATIONS

"Reduced Driving Voltage Optical Duobinary Transmitter and Its Impact on Transmission Performance Over Standard Single-Mode Fiber," by J.M. Gené, et al., IEEE Photonics Technology Letters, vol. 14, No. 6, Jun. 2002, pp. 843-845.

(Continued)

*Primary Examiner*—Leslie Pascal
(74) *Attorney, Agent, or Firm*—Mendelsohn, Drucker & Associates, P.C.; Yuri Gruzdkov; Steve Mendelsohn

(57) ABSTRACT

An optical receiver adapted to process an optical duobinary signal received over a transmission link in an optical communication system. In one embodiment, the receiver has an optical-to-electrical signal converter coupled to a decoder. The decoder processes an electrical signal generated by the converter to generate a bit sequence corresponding to the optical signal. To generate a bit value, the decoder integrates the electrical signal using a sampling window and compares the integration result with a decision threshold value. In one configuration, the width of the sampling window and the decision threshold value are selected based on the eye diagram and noise distribution function, respectively, corresponding to the optical signal. Advantageously, embodiments of the present invention improve overall back-to-back (i.e., source-to-destination) system performance, e.g., by improving dispersion tolerance and/or reducing optical power corresponding to a selected bit error rate value.

19 Claims, 8 Drawing Sheets

U.S. PATENT DOCUMENTS

| | | | |
|---|---|---|---|
| 7,173,993 B2 | 2/2007 | Engl et al. ................. | 375/355 |
| 2003/0002833 A1 | 1/2003 | Futami et al. | |
| 2003/0170022 A1* | 9/2003 | Josef Moeller ............... | 398/27 |
| 2004/0071247 A1 | 4/2004 | Dunning et al. ............. | 375/355 |
| 2004/0091273 A1* | 5/2004 | Brissette et al. ............. | 398/175 |
| 2004/0151511 A1* | 8/2004 | Gill et al. .................... | 398/183 |
| 2005/0185969 A1 | 8/2005 | Moeller et al. .............. | 398/202 |
| 2005/0232644 A1 | 10/2005 | Moeller | |

FOREIGN PATENT DOCUMENTS

| | | |
|---|---|---|
| EP | 0 508 885 A2 | 10/1992 |
| WO | WO 85/05234 | 11/1985 |

OTHER PUBLICATIONS

"Reduced Complexity Optical Duobinary 10-Gb/s Transmitter Setup Resulting in an Increased Transmission Distance," by W. Kaiser, et al., IEEE Photonics Technology Letters, vol. 13, No. 8, Aug. 2001, pp. 884-886.

"Optical Duobinary Transmission System Featuring Improved Receiver Sensitivity and Reduced Optical Bandwidth," by Hoon Kim and Charles X. Yu, IEEE Photonics Technology Letters, vol. 14, No. 8, Aug. 2002.

"Enhanced Phase-Shaped Binary Transmission for Dense WDM Systems," H. Bissessur, et al., Electronics Letters, vol. 37, No. 1, Jan. 2001, pp. 45-46.

"Dispersion-Tolerant Optical Transmission System Using Duobinary Transmitter and Binary Receiver," by Kazushige Ynenaga et al., Journal of Lightwave Technology, IEEE. New York, US, ISSN: 0733-8724, vol. 15, No. 18, Aug. 1997, pp. 1530-1537.

"Modulating Pulses in Long-Haul Optics Systems" by Anjali Singh, CommDesign Feb. 7, 2002, www.comdesign.com/article/printablearticle.jhtml?articleID=16504367, 9 pages.

"return to zero binary code", by Martin H. Weik, Fiber Optics Standard Dictionary, $3^{rd}$ ed., 1997, 3 pages.

* cited by examiner

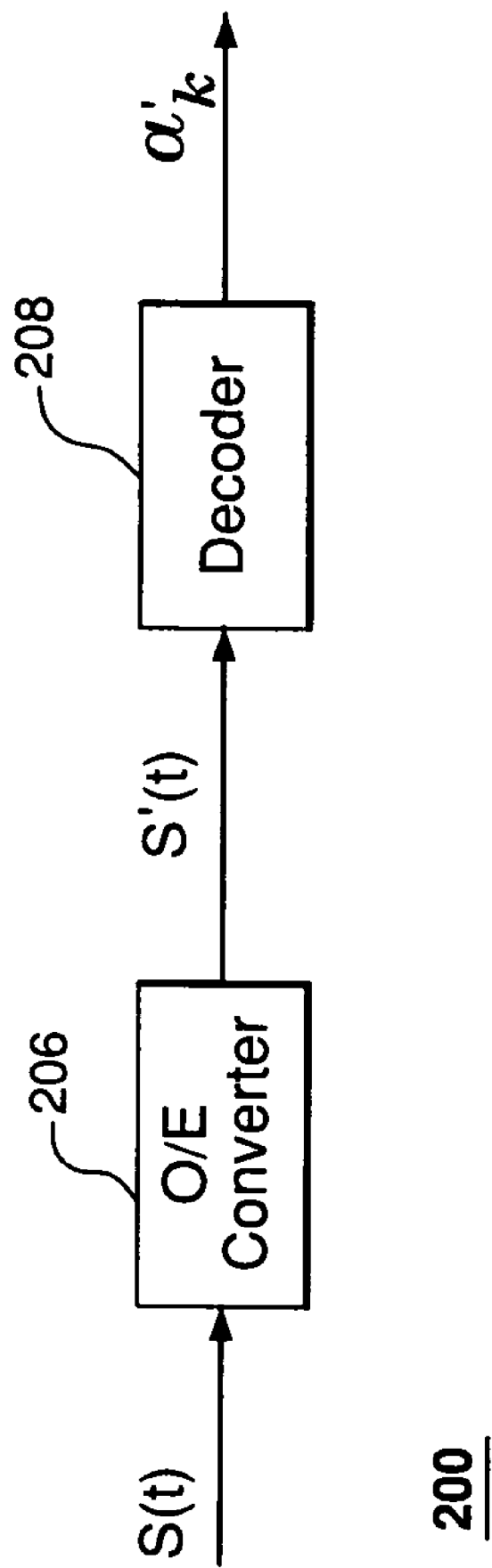

NRZ binary

Duobinary

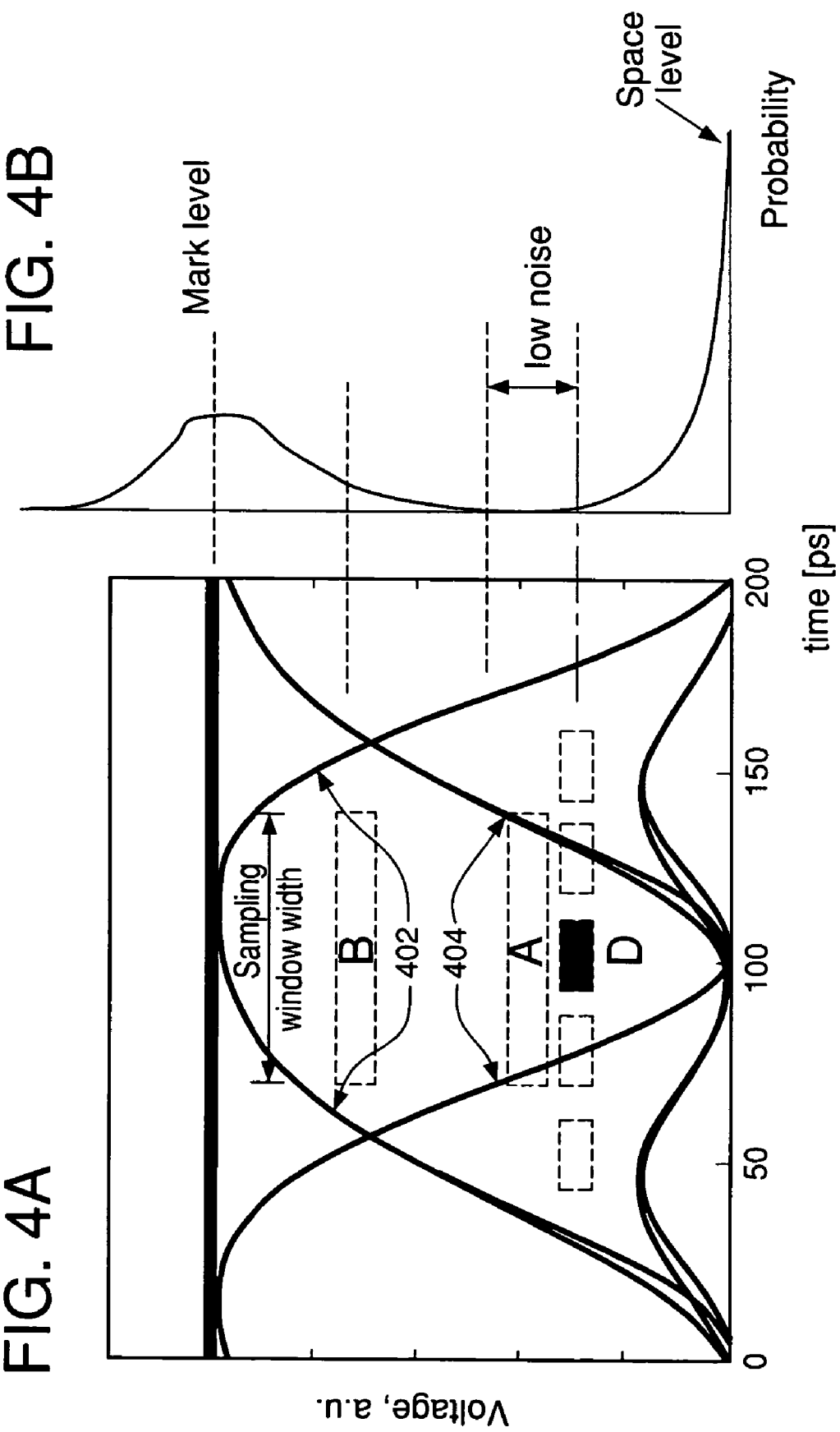

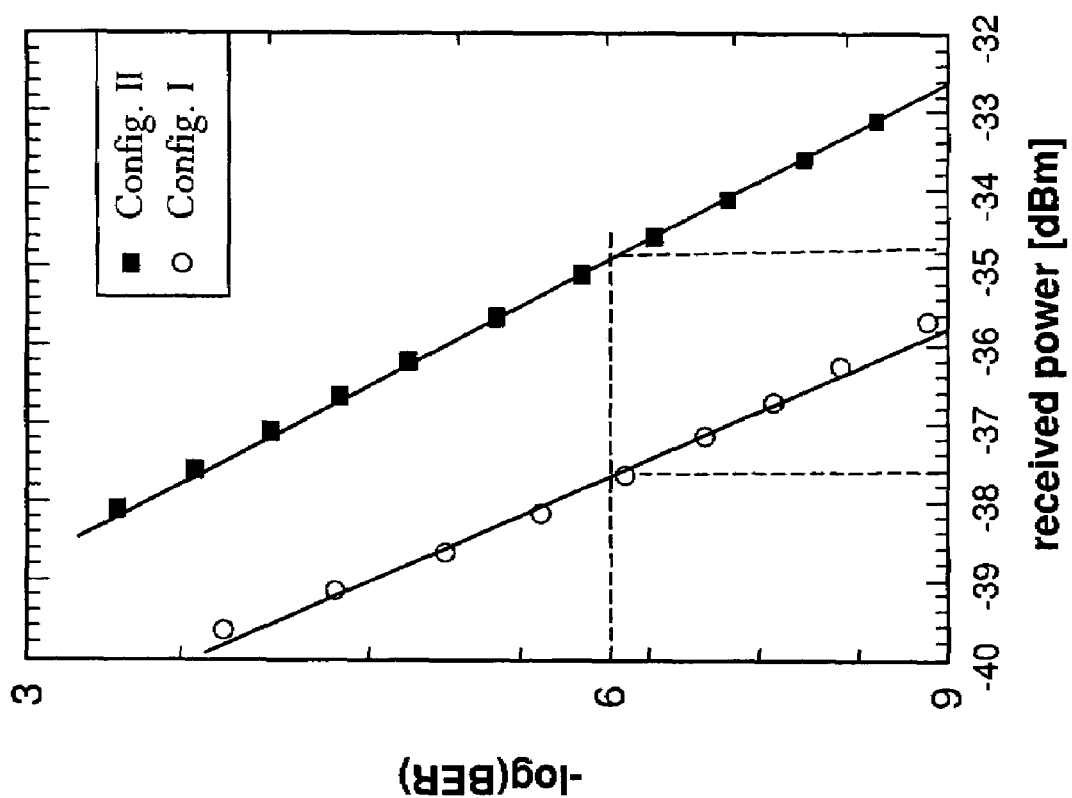

DUOBINARY RECEIVER

BACKGROUND OF THE INVENTION

1. Field of the Invention

The present invention relates to optical communication equipment and, more specifically, to equipment for processing optical duobinary signals.

2. Description of the Related Art

Duobinary signaling was introduced in the 1960s and since then has found numerous applications in communication systems. The principle of duobinary signaling is explained, for example, in an article by A. Lender that appeared in IEEE Transactions on Communications and Electronics, Vol. 82 (May, 1963), pp. 214-218, the teachings of which are incorporated herein by reference. Briefly, duobinary signaling uses three signal levels, for example, "+1", "0", and "−1". A signal corresponding to one of these levels (i.e., a duobinary symbol) is transmitted during each signaling interval (time slot). A duobinary signal is typically generated from a corresponding binary signal using certain transformation rules. Although both signals carry the same information, the bandwidth of the duobinary signal may be reduced by a factor of 2 compared to that of the binary signal. In addition, the duobinary signal may be constructed such that it has certain inter-symbol correlation (ISC) data, which can be used to implement an error-correction algorithm at the receiver.

A number of different transformations have been proposed for constructing a duobinary sequence, $b_k$, from a corresponding binary sequence, $a_k$, where k=1, 2, 3, . . . One such transformation described in the above-cited Lender article is as follows. For any particular k=m, when $a_m=0$, $b_m=0$. When $a_m=1$, $b_m$ equals either +1 or −1, with the polarity of $b_m$ determined based on the polarity of last non-zero symbol $b_{m-i}$ preceding $b_m$, where i is a positive integer. More specifically, when i is odd, the polarity of $b_m$ is the same as the polarity of $b_{m-i}$; and, when i is even, the polarity of $b_m$ is the opposite of the polarity of $b_{m-i}$. Due to the properties of this transformation, the duobinary sequence has no transitions between the "+1" and "−1" levels in successive time slots. Only transitions between (i) "0" and "+1" and (ii) "0" and "−1" levels can occur. Reconstruction of $a_k$ from a known $b_k$ is relatively straightforward. More specifically, when $b_m=\pm 1$, $a_m=1$; and, when $b_m=0$, $a_m=0$.

In optical communication systems, duobinary encoding is typically implemented using phase modulation of a carrier optical beam disclosed in U.S. Pat. No. 5,867,534, the teachings of which are incorporated herein by reference. More specifically, for the "0" bit, substantially no light is transmitted. However, the "+1" and "−1" bits are transmitted as light having +E and −E electric fields, respectively, where opposite polarities of the electric field correspond to a relative optical phase shift of 180 degrees. While an optical beam modulated in this manner is a three-level signal in terms of the electric field, it is a two-level signal in terms of the optical power. Based on this property of duobinary signals, a "binary" receiver may be adapted to serve as a duobinary receiver. A conventional binary receiver simply measures optical power. Since both "+1" and "−1" duobinary states correspond to light "on", a binary receiver can convert optical duobinary input signals into electrical output signals by measuring optical power. However, it would be desirable to have a specialized duobinary receiver, which, when deployed in a communication system in place of a regular binary receiver, would improve the system performance using advantages of optical duobinary coding.

SUMMARY OF THE INVENTION

Problems in the prior art are addressed, in accordance with the principles of the present invention, by an optical receiver adapted to process an optical duobinary signal received over a transmission link in an optical communication system. In one embodiment, the receiver has an optical-to-electrical signal converter coupled to a decoder. The decoder processes an electrical signal generated by the converter to generate a bit sequence corresponding to the optical signal. To generate a bit value, the decoder integrates the electrical signal using a sampling window and compares the integration result with a decision threshold value. In one configuration, the width of the sampling window and the decision threshold value are selected based on the eye diagram and noise distribution function, respectively, corresponding to the optical signal. Advantageously, embodiments of the present invention improve overall back-to-back (i.e., source-to-destination) system performance, e.g., by reducing the level of optical power corresponding to a selected bit error rate value in an optically pre-amplified receiver.

According to one embodiment, the present invention is a method of signal processing, comprising: converting an optical signal into an electrical signal having an amplitude corresponding to optical power of the optical signal; and sampling the electrical signal using a sampling window to generate a bit sequence corresponding to the optical signal, wherein: the sampling window has a width; the electrical signal has a series of waveforms comprising first and second pluralities of waveforms, wherein each waveform of the first plurality represents a binary "0" and each waveform of the second plurality represents a binary "1"; each waveform is integrated over the sampling window width to generate a corresponding bit value; and the sampling window width is selected to reduce contribution of the second plurality of waveforms into integration results corresponding to the first plurality of waveforms.

According to another embodiment, the present invention is an optical receiver, comprising: a signal converter adapted to convert an optical signal into an electrical signal having an amplitude corresponding to optical power of the optical signal; and a decoder coupled to the signal converter and adapted to (i) sample the electrical signal using a sampling window and (ii) generate a bit sequence corresponding to the optical signal, wherein: the sampling window has a width; the electrical signal has a series of waveforms comprising first and second pluralities of waveforms, wherein each waveform of the first plurality represents a binary "0" and each waveform of the second plurality represents a binary "1"; each waveform is integrated over the sampling window width to generate a corresponding bit value; and the sampling window width is selected to reduce contribution of the second plurality of waveforms into integration results corresponding to the first plurality of waveforms.

BRIEF DESCRIPTION OF THE DRAWINGS

Other aspects, features, and benefits of the present invention will become more fully apparent from the following detailed description, the appended claims, and the accompanying drawings in which:

FIG. 2 shows a block diagram of a representative receiver that can be used in the system of FIG. 1;

FIGS. 4A-B show a representative eye diagram of a (10 Gb/s) duobinary signal and the corresponding noise distribution function, respectively, in the system of FIG. 1;

FIGS. 6-8 graphically compare performance characteristics of different configurations of the system shown in FIG. 1.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
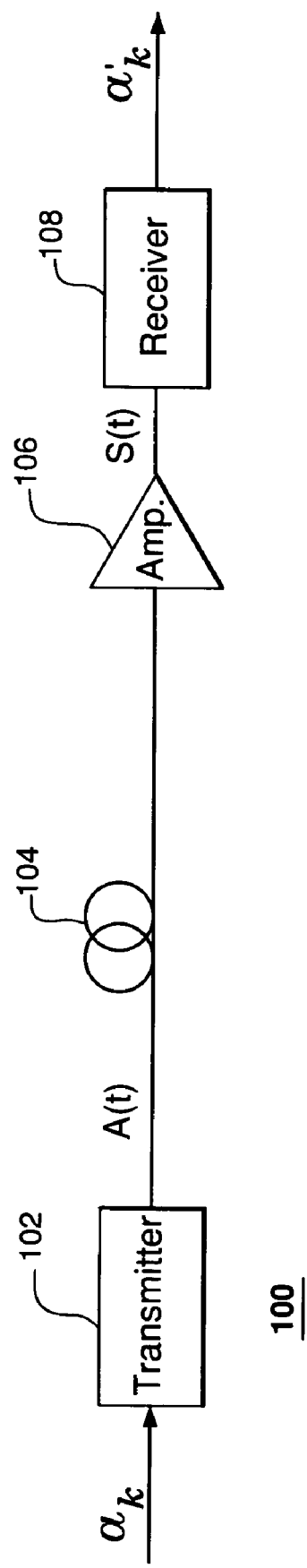
FIG. 1 shows a block diagram of a representative optical communication system adapted to use optical duobinary coding.

FIG. 1 shows a block diagram of a representative optical communication system 100 adapted to use optical duobinary coding. System 100 has a duobinary transmitter 102 coupled to a receiver 108 via a transmission link having an optical fiber 104 and one or more optical amplifiers 106. Transmitter 102 receives a binary sequence, $a_k$, and generates a corresponding optical duobinary signal, A(t), which is received as signal S(t) at receiver 108. Compared to signal A(t), signal S(t) may have distortions due to chromatic dispersion (CD) and polarization mode dispersion (PMD) in fiber 104 and/or amplification noise in amplifier 106. Receiver 108 converts optical signal S(t) into a corresponding electrical signal and processes that signal to generate binary sequence $a'_k$, corresponding to sequence $a_k$.

Descriptions of duobinary transmitters that can be used as transmitter 102 can be found, for example, in the following articles: (1) J. M. Gene et al., IEEE Photonics Technology Letters, 2002, vol. 14, p. 843; (2) W. Kaiser et al., IEEE Photonics Technology Letters, 2001, vol. 13, p. 884; (3) H. Kim and C. X. Yu, IEEE Photonics Technology Letters, 2002, vol. 14, p. 1205; and (4) H. Bissessur, Electronics Letters, 2001, vol. 37, p. 45, the teachings of all of which are incorporated herein by reference.

FIG. 2 shows a block diagram of a receiver 200 that can be used as receiver 108 in system 100. Receiver 200 has an optical-to-electrical (O/E) signal converter (e.g., a photodiode) 206 that converts optical signal S(t) into electrical signal S'(t) whose amplitude is proportional to the optical power of signal S(t). A decoder 208 samples signal S'(t), e.g., by integrating it over a fraction of each bit length termed a "sampling window," and compares the integration result with a decision threshold value. Based on the comparison, decoder 208 outputs either digital "1" or digital "0" for sequence $a'_k$. Optimal performance of decoder 208 is achieved when both the width of the sampling window and the decision threshold value are appropriately selected to minimize the number of decoding errors arising from the presence of distortions and noise in signal S'(t).

Figure 3A:
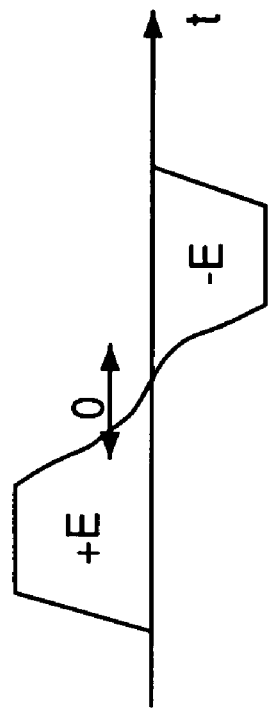
FIGS. 3A-D graphically illustrate representative distortions in optical binary and duobinary signals due to dispersion effects in an optical link.
Figure 3B:
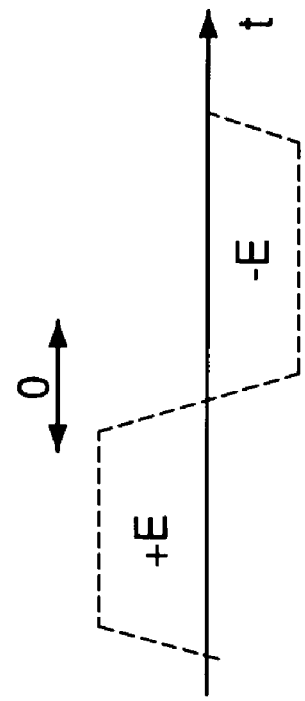
Figure 3C:
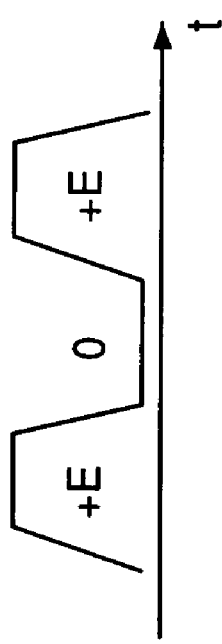
Figure 3D:
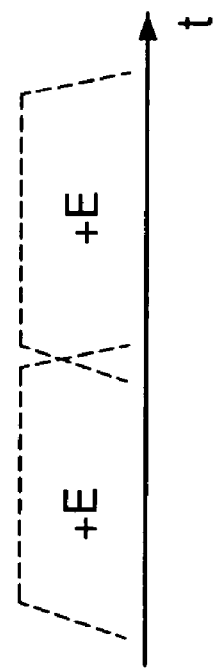

FIGS. 3A-D graphically illustrate representative distortions in optical binary and duobinary signals due to dispersion effects in an optical link, e.g., fiber 104 in system 100. However, it has to be noted that the waveforms shown in FIGS. 3A-D represent a simplified graphical depiction of actual waveforms that may be used in system 100. Referring to FIGS. 3A-B, a "101" binary sequence is mapped onto the optical domain as "+E, 0, +E" in optical binary NRZ (non-return-to-zero) coding (FIG. 3A) and as "+E, 0, –E" in optical duobinary coding (FIG. 3B). One effect of dispersion is to broaden optical pulses as shown in FIGS. 3C-D. As indicated in FIG. 3C, broadened optical pulses of the NRZ waveform interfere constructively in the area corresponding to the optical "0," thereby making it difficult to properly decode said "0" at the receiver. However, as indicated in FIG. 3D, broadened optical pulses of the duobinary waveform interfere destructively in the area corresponding to the optical "0," which may preserve a relatively narrow "valley" between two optical "ones" and improve chances of properly decoding said "0" at the receiver.

FIGS. 4A-B show a representative eye diagram of (10 Gb/s) signal S(t) and the corresponding noise distribution function, respectively, in system 100. Referring to FIG. 4A, the eye diagram shows different waveforms that may be transmitted in system 100 over a time interval corresponding to two bit periods. For example, waveform 402 having a relatively broad pulse centered at about 100 ps corresponds to a "010" binary sequence. Similarly, waveform 404 having a relatively narrow valley centered at about 100 ps corresponds to a "101" binary sequence. One skilled in the art will appreciate that other waveforms shown in FIG. 4A correspond to "111", "110", "100", "000", "001", and "011" bit sequences. Referring to FIG. 4B, at the "mark" level (i.e., the level corresponding to binary "1"), the total noise is dominated by the spontaneous beat noise in optical amplifiers, e.g., amplifiers 106 (FIG. 1). At the "space" level (i.e., the level corresponding to binary "0"), the total noise is dominated by thermal noise. However, in the region between the mark and space levels, there usually exists a region of relatively low noise probability corresponding to a minimum of the noise distribution function.

As already indicated above, to configure decoder 208, one has to select the width of the sampling window and a decision threshold value. FIGS. 4A-B graphically illustrate these selections made in accordance with prior-art processing methods and one embodiment of the present invention. More specifically, sampling windows A and B correspond to prior-art configurations of decoder 208 and sampling window D corresponds to a novel configuration of the decoder according to one embodiment of the present invention.

In a typical prior-art configuration, the sampling window has a relatively large width, e.g., greater than 30% of the bit length. One consideration for choosing a relatively large width value is that longer integration times typically reduce decoding errors due to noise averaging. It is generally believed that setting a relatively narrow sampling window will reduce the benefits of noise averaging and detrimentally affect performance of receiver 200. However, for signals affected by dispersion, using a relatively wide sampling window increases decoding errors due to wrong interpretation of zeros in "101" binary fragments (see FIGS. 3C-D). For similar reasons, analogous decoding errors may be caused by dispersion-free signals utilizing relatively large duty-cycle values, e.g., greater than 1 (see FIG. 4A). As discussed below, attempts to reduce said errors by simply adjusting the decision threshold value are largely ineffective.

Referring again to FIG. 4A, waveform 404 has a relatively narrow valley between two relatively broad pulses. Sampling windows A and B have different decision threshold values but identical widths. As can be seen in FIG. 4A, when sampling window A is used, the integration result corresponding to waveform 404 may have a relatively large contribution from the part of the waveform corresponding to the trailing edge of the preceding optical "1" and the part of the waveform corresponding to the leading edge of the next optical "1". This increases the probability of decoding errors because, even in the absence of noise, the gap between the decision threshold value and the integration result of waveform 404 is relatively narrow. The contribution of noise may then easily cause the integration result to overshoot the decision threshold value, thereby causing a decoding error for waveform 404. On the other hand, raising the decision threshold value to that of sampling window B will narrow the gap between the decision threshold value and the noise-free integration result of waveform 402. The contribution of signal spontaneous beat noise (FIG. 4B) may then cause the integration result to undershoot the decision threshold value, thereby causing a decoding error for waveform 402. In either case, the number of decoding errors is relatively large.

As will be further demonstrated below, contrary to the general expectations, the number of decoding errors in decoder 208 can be reduced for duobinary signals by decreasing the sampling window width and properly aligning said window with respect to the waveforms of the signal. For example, when sampling window D is used for waveform 404 (FIG. 4A), the contribution into the integration result from the part of the waveform corresponding to the trailing edge of the preceding optical "1" and the part of the waveform corresponding to the leading edge of the next optical "1" is significantly reduced compared to the configuration where window A or window B is used. This decreases the probability of decoding errors because the gap between the decision threshold value and the integration result of noise-free waveform 404 can now be relatively large. Consequently, it becomes more difficult for the contribution of noise to cause the integration result to overshoot the decision threshold value, which reduces the number of decoding errors. In addition, the decision threshold value itself may now be selected to correspond to the "low noise" region without incurring a relatively large penalty from the trailing/leading edges of the adjacent optical "ones." As a result, the overall contribution of noise into the integration results is reduced. Furthermore, the gap between the decision threshold value and the noise-free integration result of waveform 402 becomes relatively wide. Therefore, it becomes more difficult for the contribution of signal spontaneous beat noise (FIG. 4B) to cause said integration result to undershoot the decision threshold value, which further reduces the number of decoding errors.

In one configuration, the width of sampling window D for decoder 208 is selected based on an eye diagram similar to that shown in FIG. 4A. For example, when the duty cycle value or dispersion caused optical pulse broadening is relatively large, the "zero" valley of waveforms analogous to waveform 404 becomes relatively narrow. In accordance with the principles of the present invention, the sampling window width is selected to be even narrower than the "zero" valley, e.g., as illustrated in FIG. 4A. In one implementation, the width of sampling window D is less than about 25% of the bit length or preferably fixed at about 10% of the bit length.

Figure 5:
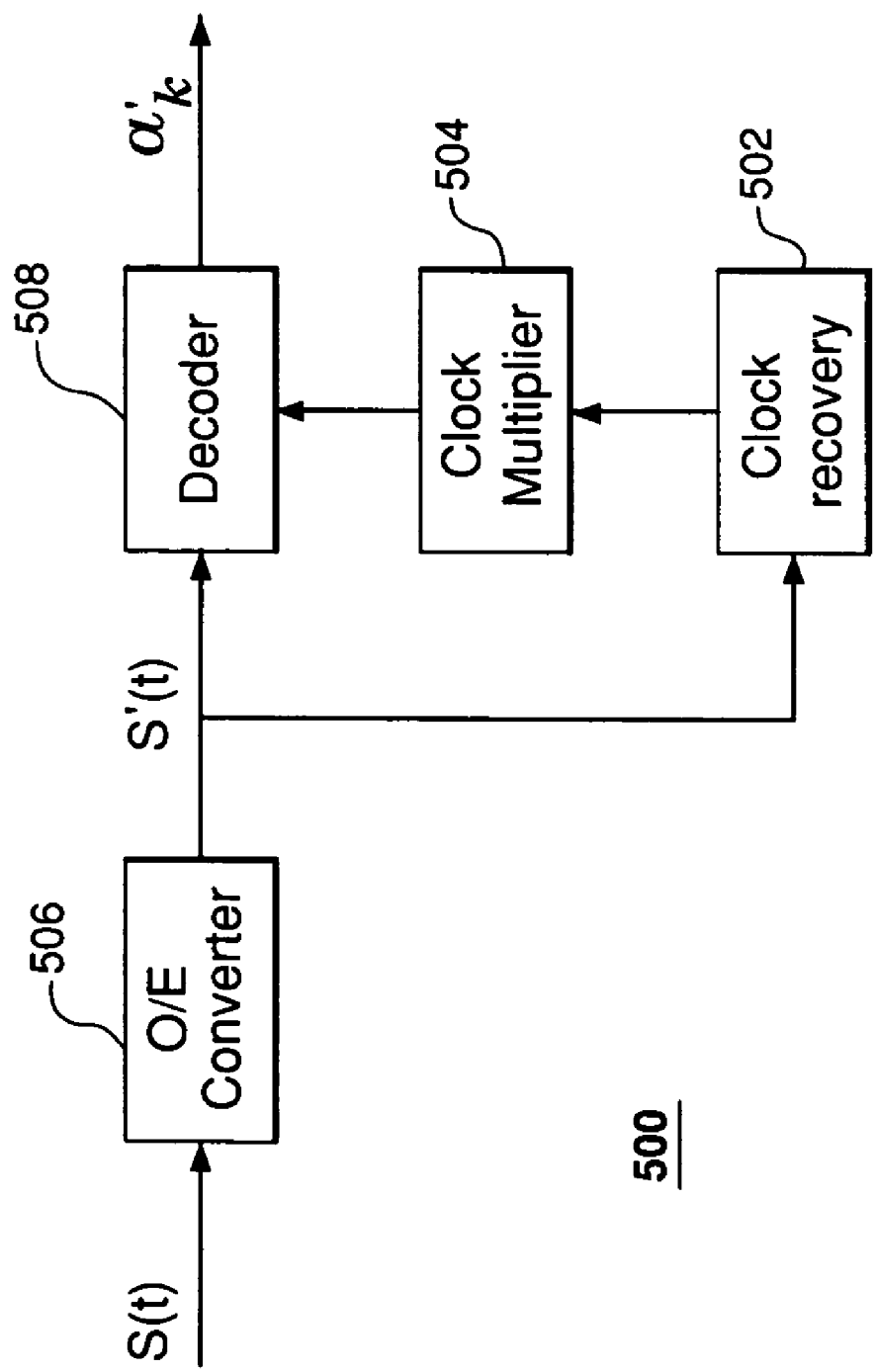
FIG. 5 shows a block diagram of a receiver that can be used in the system of FIG. 1 according to one embodiment of the present invention.

FIG. 5 shows a block diagram of a receiver 500 that can be used as receiver 108 in system 100 according to one embodiment of the present invention. Similar to receiver 200 of FIG. 2, receiver 500 is adapted to receive optical duobinary signal S(t) and convert it into a corresponding binary sequence $a'_k$. Receiver 500 has an O/E signal converter 506 that is similar to converter 206 of receiver 200. A decoder 508 samples signal S'(t) generated by converter 506, e.g., using a configuration corresponding to sampling window D of FIG. 4A. To provide an appropriate time reference for aligning the sampling window, receiver 500 has a clock recovery circuit 502 and a clock multiplier 504. Circuit 502 processes signal S'(t) to generate a first clock signal synchronized with signal S'(t). Clock multiplier 504 multiplies the frequency of the first clock signal and generates a second clock signal applied to decoder 508. In a representative configuration of receiver 500, the second clock signal has a frequency value four times that of the first clock. Decoder 508 then uses clock pulses to align sampling window D with respect to signal S'(t). In addition, the width of the sampling window may be selected based on the interpulse separation in the second clock signal. One skilled in the art will appreciate that other synchronization techniques may similarly be used.

Figure 6:
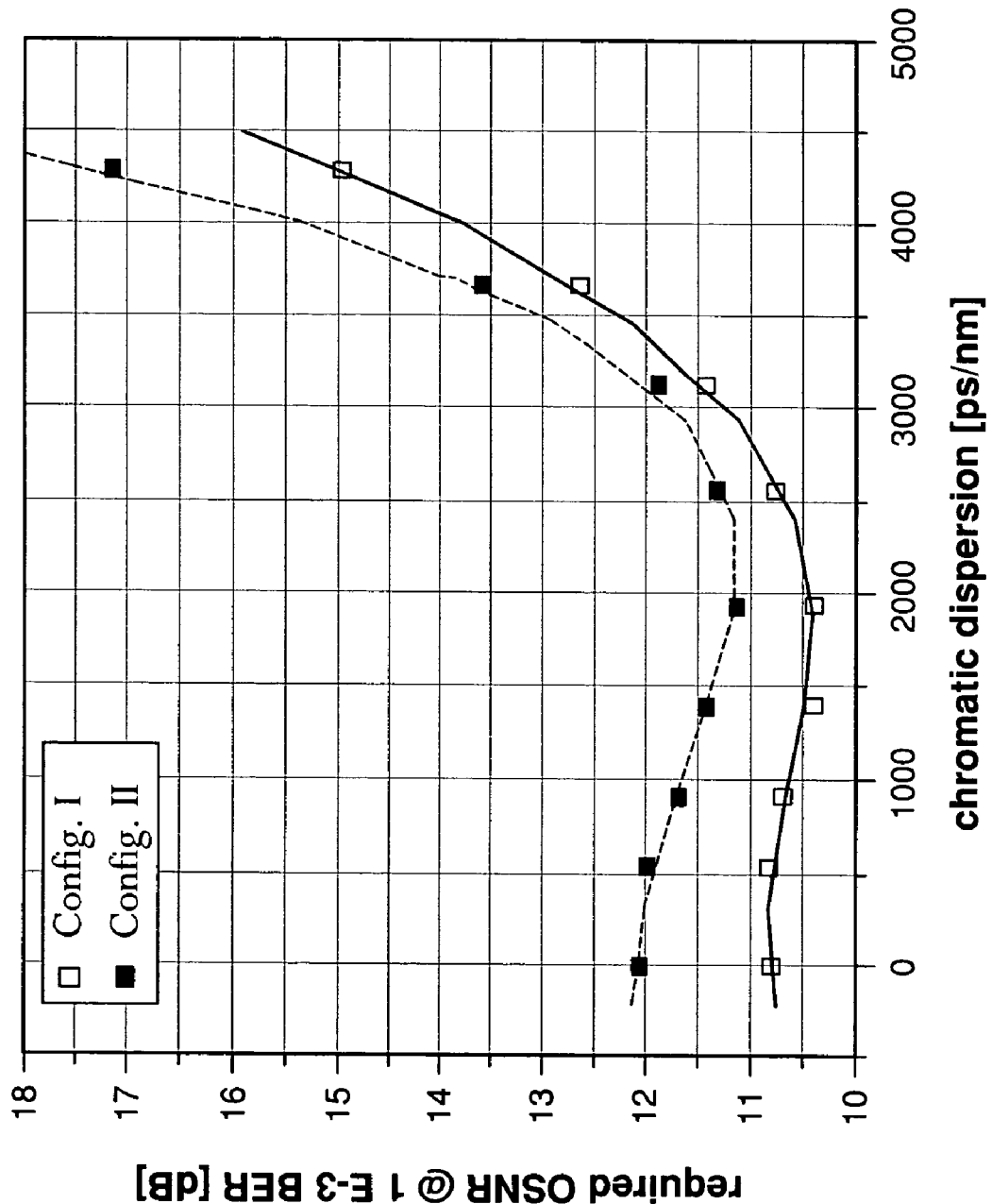
Figure 7:
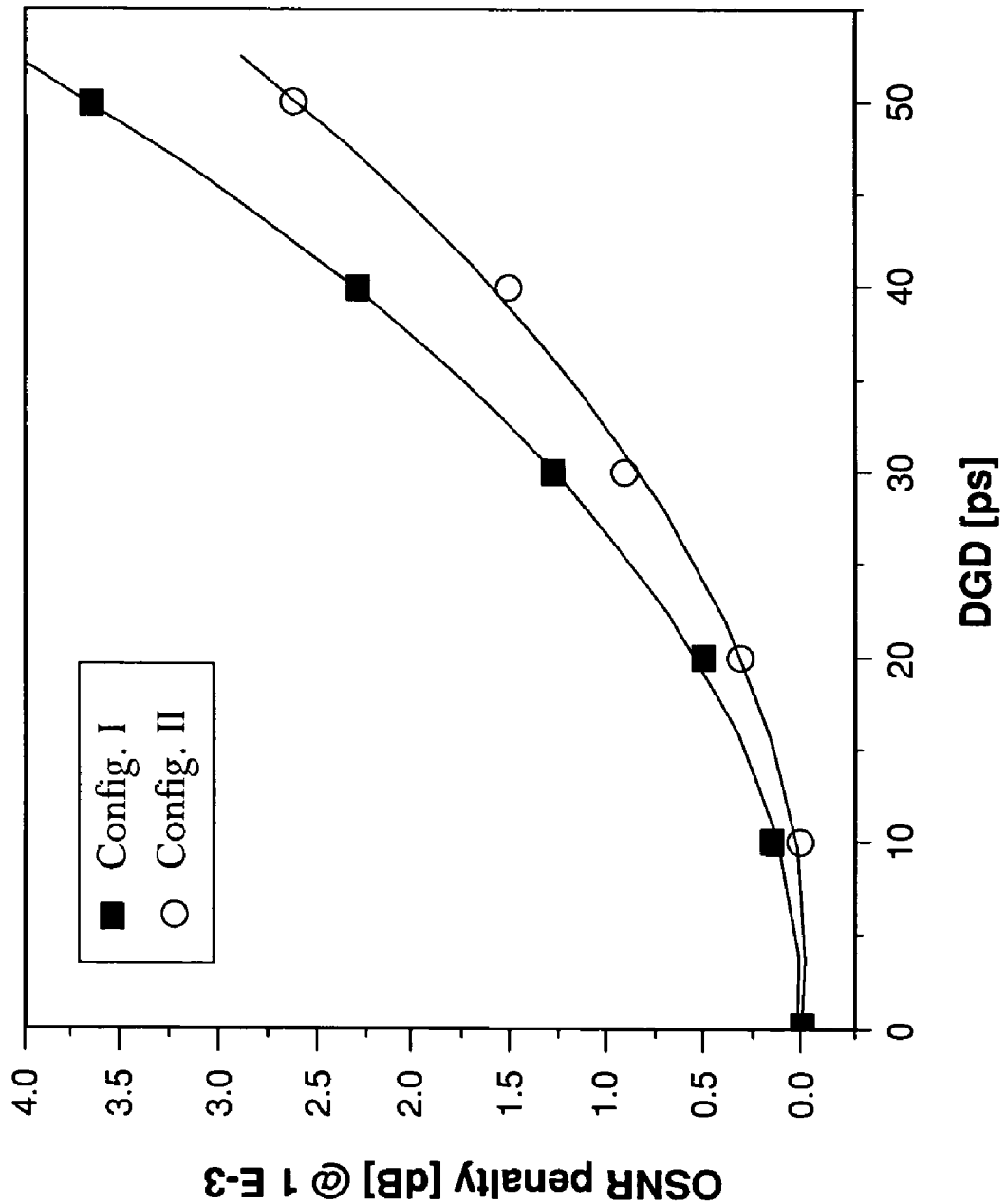

FIGS. 6-8 graphically compare performance characteristics of two different configurations of system 100. More specifically, FIGS. 6-7 show dispersion tolerance at bit error rate (BER) of $10^{-3}$, and FIG. 8 shows dependence of BER on the power of signal S(t). In both configurations, transmitter 102 is a transmitter based on a Mach-Zehnder modulator operating at a bit rate of 10 Gb/s. In configuration 1, receiver 108 is receiver 500 (FIG. 5), wherein the second clock signal has a frequency value corresponding to four times the bit rate. In configuration II, receiver 108 is receiver 200 (FIG. 2), which has (i) a sampling window width corresponding to that of sampling windows A and B shown in FIG. 4 and (ii) a decision threshold value set at about 25% of the mark level.

Referring to FIG. 6, for system 100, configuration I provides optical signal-to-noise (OSNR) gain of about 1 dB with respect to configuration II for chromatic dispersion values between 0 and about 4000 ps/nm. Referring to FIG. 7, configuration I consistently out performs configuration II for PMD-affected signals having differential group delay (DGD) values between 0 and about 50 ps. On average, configuration I improves PMD tolerance by about 20%. Referring to FIG. 8, for a selected bit error rate value, configuration I provides substantial gain over configuration II in terms of the optical power at the receiver. For example, for a BER value of $10^{-6}$, configuration I lowers the coresponding optical power by about 3 dB with respect to that in configuration II. In summary, embodiments of the present invention improve dispersion tolerance and reduce optical power corresponding to a selected BER value in duobinary transmission systems, thereby improving overall back-to-back (i.e., source-to-destination) performance of such systems.

While this invention has been described with reference to illustrative embodiments, this description is not intended to be construed in a limiting sense. Although the present invention is described with reference to duobinary signals, it can also be used for processing other types of signals, e.g., high-duty-cycle binary NRZ signals. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

What is claimed is:

1. A method of signal processing, comprising:
converting an optical signal into an electrical signal having an amplitude corresponding to optical power of the optical signal; and
sampling the electrical signal using a sampling window to generate a bit sequence corresponding to the optical signal, wherein:
the sampling window has a width;
the electrical signal has a series of waveforms comprising first and second pluralities of waveforms, wherein each waveform of the first plurality represents a binary "0" and each waveform of the second plurality represents a binary "1";
each waveform is integrated over the sampling window width to generate an integration result;
the integration result is compared with a decision threshold value to generate a corresponding bit value;
the sampling window width is selected to be less than a bit length in the electrical signal in order to reduce contribution of the second plurality of waveforms into integration results corresponding to the first plurality of waveforms;
the optical signal is an optical duobinary signal; and
the sampling window width is less than about 25% of a bit length.

2. The method of claim 1, wherein, for each waveform:
when the integration result is greater than or equal to the decision threshold value, the bit value is binary "1";
when the integration result is smaller than the decision threshold value, the bit value is binary "0"; and
the decision threshold value is selected to correspond to a level different from a mean of space and mark levels in the electrical signal in order to reduce contribution of spontaneous bit noise and thermal noise into the integration results corresponding to the first and second pluralities of waveforms.

3. The method of claim 1, wherein the width of the sampling window is selected based on an eye diagram of the optical signal.

4. The method of claim 1, further comprising:
generating a first clock signal based on the electrical signal;
multiplying a frequency of the first clock signal to generate a second clock signal; and
selecting the width of the sampling window using the second clock signal.

5. The method of claim 4, comprising aligning the sampling window with respect to the waveforms based on the second clock signal.

6. The method of claim 1, wherein the sampling window width is selected based on duty cycle corresponding to the second plurality of waveforms.

7. The method of claim 6, wherein the duty cycle is greater than one.

8. The method of claim 1, wherein the sampling window width is about 10% of a bit length.

9. An optical receiver, comprising:
a signal converter adapted to convert an optical signal into an electrical signal having an amplitude corresponding to optical power of the optical signal; and
a decoder coupled to the signal converter and adapted to (i) sample the electrical signal using a sampling window and (ii) generate a bit sequence corresponding to the optical signal, wherein:
the sampling window has a width;
the electrical signal has a series of waveforms comprising first and second pluralities of waveforms, wherein each waveform of the first plurality represents a binary "0" and each waveform of the second plurality represents a binary "1";
the decoder is adapted to:
integrate each waveform over the sampling window width to generate an integration result;
compare the integration result with a decision threshold value to generate a corresponding bit value; and
select the sampling window width to be less than a bit length in the electrical signal in order to reduce contribution of the second plurality of waveforms into integration results corresponding to the first plurality of waveforms;
the optical signal is an optical duobinary signal; and
the sampling window width is less than about 25% of a bit length.

10. The receiver of claim 9, wherein, for each waveform:
when the integration result is greater than or equal to the decision threshold value, the bit value is binary "1";
when the integration result is smaller than the decision threshold value, the bit value is binary "0"; and
the decision threshold value is selected to correspond to a level different from a mean of space and mark levels in the electrical signal in order to reduce contribution of spontaneous bit noise and thermal noise into the integration results corresponding to the first and second pluralities of waveforms.

11. The receiver of claim 9, wherein the sampling window width is selected based on an eye diagram of the optical signal.

12. The receiver of claim 9, further comprising:
a clock recovery circuit coupled to the signal converter and adapted to generate a first clock signal based on the electrical signal; and
a clock multiplier coupled between the clock recovery circuit and the decoder and adapted to multiply a frequency of the first clock signal to generate a second clock signal, wherein:
the decoder is adapted to select the sampling window width based on the second clock signal.

13. The receiver of claim 12, wherein the decoder is adapted to align the sampling window with respect to the waveforms based on the second clock signal.

14. The receiver of claim 9, wherein the sampling window width is selected based on duty cycle corresponding to the second plurality of waveforms.

15. The receiver of claim 14, wherein the duty cycle is greater than one.

16. The receiver of claim 9, wherein the sampling window width is about 10% of a bit length.

17. An optical communication system, comprising an optical transmitter and an optical receiver coupled via a transmission link, wherein the optical receiver comprises:
a signal converter adapted to convert an optical signal received from the transmitter via the transmission link into an electrical signal having an amplitude corresponding to optical power of the optical signal; and
a decoder coupled to the signal converter and adapted to (i) sample the electrical signal using a sampling window and (ii) generate a bit sequence corresponding to the optical signal, wherein:
the sampling window has a width;
the electrical signal has a series of waveforms comprising first and second pluralities of waveforms, wherein each waveform of the first plurality represents a binary "0" and each waveform of the second plurality represents a binary "1";

the decoder is adapted to:
  integrate each waveform over the sampling window width to generate an integration result;
  compare the integration result with a decision threshold value to generate a corresponding bit value; and
  select the sampling window width to be less than a bit length in the electrical signal in order to reduce contribution of the second plurality of waveforms into integration results corresponding to the first plurality of waveforms;

the optical signal is an optical duobinary signal; and
the sampling window width is less than about 25% of a bit length.

18. The system of claim 17, wherein:
when the integration result is greater than or equal to the decision threshold value, the bit value is binary "1";
when the integration result is smaller than the decision threshold value, the bit value is binary "0"; and
the decision threshold value is selected to correspond to a level different from a mean of space and mark levels in the electrical signal in order to reduce contribution of spontaneous bit noise and thermal noise into the integration results corresponding to the first and second pluralities of waveforms.

19. An optical receiver, comprising:
means for converting an optical signal into an electrical signal having an amplitude corresponding to optical power of the optical signal; and
means for sampling the electrical signal using a sampling window to generate a bit sequence corresponding to the optical signal, wherein:
the sampling window has a width:
the electrical signal has a series of waveforms comprising first and second pluralities of waveforms, wherein each waveform of the first plurality represents a binary "0" and each waveform of the second plurality represents a binary "1";
each waveform is integrated over the sampling window width to generate an integration result;
the integration result is compared with a decision threshold value to generate a corresponding bit value; and
the sampling window width is selected to be less than a bit length in the electrical signal in order to reduce contribution of the second plurality of waveforms into integration results corresponding to the first plurality of waveforms;
the optical signal is an optical duobinary signal; and
the sampling window width is less than about 25% of a bit length.

* * * * *

UNITED STATES PATENT AND TRADEMARK OFFICE
CERTIFICATE OF CORRECTION

PATENT NO.       : 7,613,402 B2  Page 1 of 1
APPLICATION NO.  : 10/730413
DATED            : November 3, 2009
INVENTOR(S)      : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1539 days.

Signed and Sealed this

Nineteenth Day of October, 2010

David J. Kappos
*Director of the United States Patent and Trademark Office*